(12) United States Patent
Sumiyashiki

(10) Patent No.: US 7,744,030 B2
(45) Date of Patent: *Jun. 29, 2010

(54) WEBBING RETRACTOR

(75) Inventor: Akira Sumiyashiki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 66 days.

This patent is subject to a terminal disclaimer.

(21) Appl. No.: 12/027,248

(22) Filed: Feb. 6, 2008

(65) Prior Publication Data

US 2008/0191083 A1  Aug. 14, 2008

(30) Foreign Application Priority Data

Feb. 8, 2007  (JP) .............................. 2007-029044

(51) Int. Cl.
 *B60R 22/38* (2006.01)
(52) U.S. Cl. ................................. 242/383.1; 242/383.2
(58) Field of Classification Search ... 242/383.1–383.5, 242/384.6, 375.1
 See application file for complete search history.

(56) References Cited

U.S. PATENT DOCUMENTS

| | | | | |
|---|---|---|---|---|
| 4,687,156 A | * | 8/1987 | Mori | 242/383.1 |
| 4,732,346 A | * | 3/1988 | Tamura et al. | 242/383.1 |
| 4,749,142 A | * | 6/1988 | Saitow | 242/382.2 |
| 6,523,771 B2 | * | 2/2003 | Sumiyashiki | 242/383.2 |
| 6,527,214 B2 | * | 3/2003 | Sumiyashiki | 242/383.2 |
| 6,530,536 B2 | * | 3/2003 | Sumiyashiki et al. | 242/383.2 |
| 6,883,742 B2 | * | 4/2005 | Sumiyashiki et al. | 242/383.1 |
| 2008/0210802 A1 | * | 9/2008 | Sumiyashiki | 242/379.1 |

FOREIGN PATENT DOCUMENTS

| | | |
|---|---|---|
| JP | 10-230817 A | 9/1998 |
| JP | 2000-52922 A | 2/2000 |
| JP | 2002-321595 A | 11/2002 |

OTHER PUBLICATIONS

Chinese Office Action dated May 8, 2009 from corresponding Chinese Patent Application No. 200810004820.2.

* cited by examiner

*Primary Examiner*—Sang Kim
(74) *Attorney, Agent, or Firm*—Roberts Mlotkowski Safran & Cole, P.C.; Thomas W. Cole

(57) ABSTRACT

In a webbing retractor, when a V-gear rotates in a take-up direction at an angular velocity of less than a preset upper limit angular velocity VH and a braking pawl moves toward an engaging position, an anchor claw of the braking pawl meshes with an internal tooth of a braking gear, and the braking gear is connected via the braking pawl to the V-gear so as to rotate integrally in the take-up direction. In this way, a coil portion of a torsion coil spring twists in the take-up direction (diameter contracting direction) via anchor pins. Therefore, an inner diameter of the coil portion contracts, and an inner peripheral surface of the coil portion press-contacts an outer peripheral surface of a braking shaft. End locking is prevented from arising when a spool, which rotates in the take-up direction, stops.

13 Claims, 8 Drawing Sheets

WEBBING RETRACTOR

CROSS-REFERENCE TO RELATED APPLICATION

This application claims priority under 35 USC 119 from Japanese Patent Application No. 2007-29044, the disclosure of which is incorporated by reference herein.

BACKGROUND OF THE INVENTION

1. Field of the Invention

The present invention relates to a webbing retractor that takes-up and accommodates a webbing for restraining the body of a vehicle occupant seated in a seat.

2. Description of the Related Art

A locking mechanism, which restricts rotation of a reel shaft (a spool) in a pull-out direction at a time of rapid deceleration of a vehicle, is provided at a webbing retractor which structures a seat belt device of a vehicle, as disclosed in Japanese Patent Application Laid-Open (JP-A) No. 10-230817 for example. It is known that, in such a webbing retractor, when, from the state in which the webbing belt is pulled-out from the spool, the entire amount of the webbing belt is suddenly taken-up onto the spool due to the urging force of a take-up spring, a so-called end locking phenomenon may arise in which, due to the angular acceleration in the decelerating direction (negative angular acceleration) which arises immediately before completion of the taking-up and the shock applied to the spool at the time when the entire amount of the webbing belt is taken-up, the spool locking mechanism operates such that rotation of the spool in the pull-out direction is locked.

The webbing retractor of JP-A No. 10-230817 is equipped with a ratchet wheel which is supported so as to be able to rotate relative to the spool, and which operates the locking mechanism by causing a delay in rotation with respect to the spool; a lock arm which is pivotally-supported at the ratchet wheel so as to swing freely, and which meshes with internal teeth of a gear case so as to impede rotation of the ratchet wheel in the pull-out direction; and an inertial plate which is supported so as to be able to rotate relative to the spool, and which, when rotational speed in the webbing pull-out direction of a predetermined amount or more is applied, causes a delay in rotation with respect to the spool and swings the lock arm in the direction of the internal teeth of the gear case.

Further, in the above-described webbing retractor, due to rotation of the spool in the take-up direction after the spool is locked by the aforementioned locking mechanism, a cam portion, which is formed at the side end surface of one axial direction end side of the spool, pushes an arm portion formed integrally with the lock arm so as to swing the lock arm in a direction of canceling engagement with an engaged portion. In this way, if the spool is rotated slightly in the take-up direction, the locking of the spool by the locking mechanism can be released. Therefore, in a case in which end locking arises, if the webbing belt can be rewound slightly by forcibly pulling-out the belt and creating leeway in winding, the end locking can be cancelled.

However, the webbing retractor disclosed in JP-A No. 10-230817 does not prevent end locking in and of itself.

SUMMARY OF THE INVENTION

In view of the aforementioned, an object of the present invention is to provide a webbing retractor which can effectively prevent end locking from occurring at the time when a spool, which rotates in a take-up direction, stops.

In order to overcome the above-described problems, a webbing retractor of a first aspect of the present invention includes: a spool on which a webbing for restraining a vehicle occupant is taken-up, the spool being able to rotate in a take-up direction and in a pull-out direction that is opposite to the take-up direction; an urging mechanism urging the spool in the take-up direction; and a spool braking mechanism that, when an angular velocity of the spool rotating in the take-up direction due to urging force of the urging mechanism, reaches a predetermined upper limit angular velocity, applies resistance to rotation of the spool and decelerates a rotational speed of the spool in the take-up direction.

Further, in the webbing retractor of the above-described aspect, the spool braking mechanism may have a braking shaft disposed coaxially with the spool, and a decelerating member applying rotation resistance to an outer peripheral surface of the braking shaft.

In the webbing retractor of the above-described structure, the spool braking mechanism may further have: a rotating body disposed coaxially with the spool; a braking gear disposed coaxially with the spool, and able to rotate relative to the spool; a braking pawl disposed at the rotating body, and causing the braking gear to rotate integrally with the rotating body in the take-up direction; and a pawl driving mechanism that, when the spool is rotating in the take-up direction at less than the predetermined upper limit angular velocity, holds the braking pawl at a separated position at which the braking pawl is separated from the braking gear, and, when the spool rotates in the take-up direction at greater than or equal to the predetermined angular velocity, operates the braking pawl to an engaging position at which the braking pawl engages with the braking gear, and the decelerating member may have an elastic member that applies rotation resistance to the outer peripheral surface of the braking shaft when the braking gear rotates integrally with the rotating body.

Moreover, in the webbing retractor of the above-described structure, the pawl driving mechanism may have: a mass body disposed at an outer peripheral side of an axial center of the rotating body, and able to move the braking pawl between the separated position and the engaging position; and a mass body urging member urging the mass body toward the separated position, and the mass body urging member may be structured such that, when the rotating body is rotating in the take-up direction at less than the predetermined angular velocity, the mass body urging member holds the mass body at the separated position, and when the rotating body rotates in the take-up direction at greater than or equal to the predetermined angular velocity, the mass body swings by centrifugal force toward the engaging position against urging force of the mass body urging member.

As described above, in accordance with the webbing retractor relating to the present invention, end locking can be effectively prevented from occurring at the time when the spool, which rotates in the take-up direction, stops.

DETAILED DESCRIPTION OF THE INVENTION

Webbing retractors relating to exemplary embodiments of the present invention will be described hereinafter with reference to the drawings.

First Exemplary Embodiment

Structure of the Exemplary Embodiment

Figure 1:
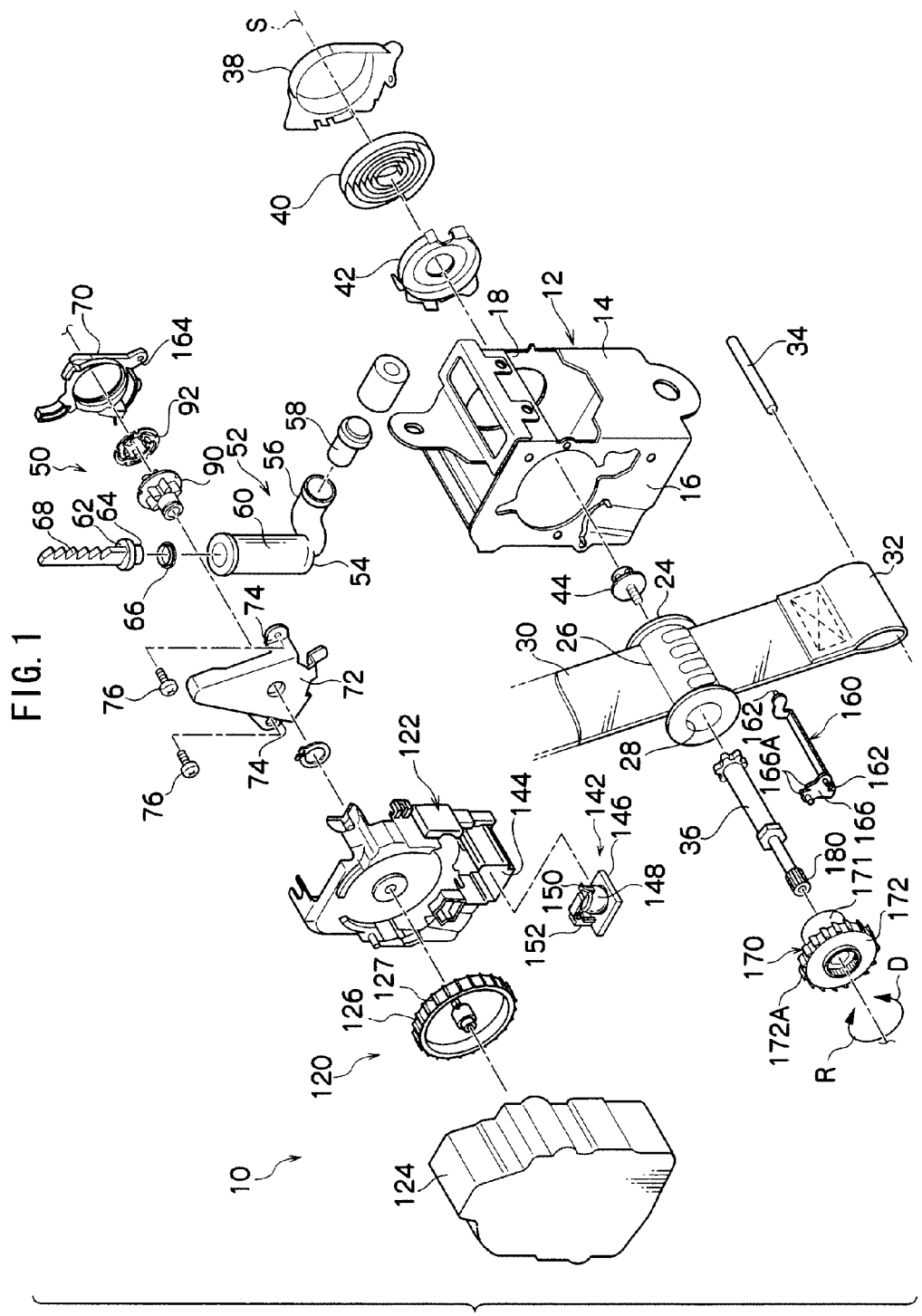
FIG. 1 is an exploded perspective view showing the overall structure of a webbing retractor relating to a first exemplary embodiment of the present invention.

The overall structure of a webbing retractor 10 relating to a first exemplary embodiment of the present invention is shown in an exploded perspective view in FIG. 1. Note that, in the drawings, reference letter S indicates the axial center of the device, and description will be given hereinafter with the direction along the axial center S being the axial direction of the device.

As shown in FIG. 1, the webbing retractor 10 has a frame 12. The frame 12 has a back plate 14 which is plate-shaped and whose direction of thickness is along, for example, the substantially left-right direction of the vehicle. The webbing retractor 10 is mounted to a vehicle body due to the back plate 14 being fixed to the vehicle body, for example, in a vicinity of the lower end portion of the center pillar, by a fastening means such as bolts or the like.

A leg plate 16 is formed so as to be bent toward the inner side in the vehicle transverse direction (the substantially left-right direction of the vehicle), from one transverse direction end of the back plate 14 which runs along the substantially vehicle longitudinal direction. Further, a leg plate 18 is formed to bend in the same direction as the leg plate 16, from the other transverse direction end of the back plate 14. A spool 24 is provided between the leg plate 16 and the leg plate 18. The spool 24 is formed substantially in the shape of a cylindrical tube whose axial direction is along the direction in which the leg plate 16 and the leg plate 18 oppose one another. An insert-through hole 26 is formed in the spool 24.

Both ends of the insert-through hole 26 open at the outer peripheral portion of the spool 24. The shapes of these openings are slit shapes which are long along the axial direction of the spool 24. The insert-through hole 26 is formed so as to sidestep a through-hole 28 which passes-through the axially central portion of the spool 24. The longitudinal direction proximal end side of an elongated-belt-shaped webbing belt 30 is inserted-through from one open end of the insert-through hole 26.

A tubular portion 32, which passes-through in the transverse direction, is formed at the longitudinal direction proximal end portion of the webbing belt 30. Due to a removal-preventing shaft 34 being disposed at the inner side of the tubular portion 32 which has passed-through the insert-through hole 26, the proximal end side of the webbing belt 30 is prevented from coming-out of the insert-through hole 26 at the time when the webbing belt 30 is pulled toward the distal end side thereof. Due to the spool 24 rotating in a predetermined take-up direction (the direction of arrow R) around the axial center S, the webbing belt 30, which is prevented from coming-out from the insert-through hole 26 in this way, is taken-up and accommodated in layers from the proximal end side thereof onto the outer peripheral side of the spool 24.

On the other hand, a rod-shaped torsion shaft 36 which is slender along the axial direction is disposed at the inner side of the through-hole 28. The torsion shaft 36 is connected to the spool 24, in a state in which rotation of the torsion shaft 36 around the axis is prevented, at the inner side of the spool 24 at the leg plate 18 side. The leg plate 18 side end portion of the torsion shaft 36 passes-through the leg plate 18 and projects-out to the exterior of the frame 12.

A spring cover 38 is disposed at the outer side of the leg plate 18. The spring cover 38 is formed in the shape of a box which opens toward the leg plate 18 side, and is fixed to the leg plate 18 by a fastening means such as screws or the like or by the fitting-together of fit-together claws or the like which are formed at the spring cover 38 or the leg plate 18. A spiral spring 40 is accommodated at the inner side of the spring cover 38. The spiral spring 40 is a spring which is structured such that the urging force thereof gradually increases due to the inner peripheral end in the direction of the spiral being rotated and displaced, with respect to the outer side end in the direction of the spiral, in a pull-out direction (the direction of arrow D) which is opposite to the take-up direction. The outer side end in the direction of the spiral of the spiral spring 40 is anchored on a spring seat 42 which is disposed at the open side of the spring cover 38 with respect to the spiral spring 40.

The spring seat 42 is fixed to the spring cover 38. The outer peripheral end in the direction of the spiral of the spiral spring 40 is connected to the leg plate 18 (the frame 12) via the spring seat 42 and the spring cover 38. Further, an adapter 44 is provided in a vicinity of the inner side end in the direction of the spiral of the spiral spring 40. The inner side end in the direction of the spiral of the spiral spring 40 is fixed to the outer peripheral portion of the adapter 44. Moreover, the leg plate 18 side end portion of the torsion shaft 36, which is passed-through the spring seat 42, is fit-together with and fixed to the axially central portion of the adapter 44.

On the other hand, a pretensioner mechanism 50 is provided at the axial direction outer side of the leg plate 16. In a state of rapid deceleration of the vehicle, the pretensioner mechanism 50 rotates the spool 24 in the take-up direction and takes-up the webbing belt 30. A gear case 70 is provided at the leg plate 16 side of the pretensioner mechanism 50. A cover plate 72 is provided at the side of the pretensioner mechanism 50 opposite the side at which the gear case 70 is located, and is fastened and fixed to the frame 12 by screws or the like. Therefore, the pretensioner mechanism 50 is connected such that, even if the torsion shaft 36 rotates, a clutch 92 does not rotate, and when a pinion 90 rotates in the take-up direction, due to this rotational force, a portion of the clutch 92 deforms and connects with the torsion shaft 36 so as to rotate integrally therewith. In the exemplary embodiments of the present invention, a rack-and-pinion system, in which a rack bar 68 engages with the pinion 90, is illustrated.

A locking mechanism 120 is provided at the axial direction outer side of the leg plate 16. The locking mechanism 120 has a sensor holder 122. The sensor holder 122 is formed in a concave shape which partially opens toward the leg plate 16 side. A portion of the cover plate 72 is positioned at the inner side of the portion which opens toward the leg plate 16 side. The sensor holder 122 is fixed to the leg plate 16 due to cylindrical-tube-shaped projections, which are formed to project out toward the leg plate 16 side from predetermined regions of the outer peripheral portion of the sensor holder 122, being fit into holes which are formed at the leg plate 16, and plug pins (not shown) being press-fit in at the inner sides of the projections in this state.

At the webbing retractor 10, a sensor cover 124 is provided at the axial direction outer side of the sensor holder 122. Fit-together claws or the like are formed at the outer peripheral portion or the like of the sensor cover 124, and fit-together with predetermined regions of the sensor holder 122 such that the sensor cover 124 is mechanically connected to the sensor holder 122. An unillustrated, tubular shaft-receiving portion is formed at the sensor cover 124, and pivotally-supports the other end portion of the torsion shaft 36 which is passed-through the sensor holder 122, such that this other end portion of the torsion shaft 36 rotates freely.

A V-gear 126 is provided at the webbing retractor 10 between the sensor holder 122 and the sensor cover 124. The V-gear 126 is formed in the shape of a shallow cylindrical tube having a floor, and opens toward the sensor cover 124 side. Plural (24 in the present exemplary embodiment) ratchet teeth 127 are formed at the outer peripheral surface of the V-gear 126. The ratchet teeth 127 are arrayed at the outer peripheral surface of the V-gear 126 at a uniform pitch (a 15° pitch) along the peripheral direction. The torsion shaft 36 passes-through the central portion of the V-gear 126. The V-gear 126 is disposed coaxially with the torsion shaft 36, and is connected to the torsion shaft 36 so as to rotate integrally therewith.

Figure 2:
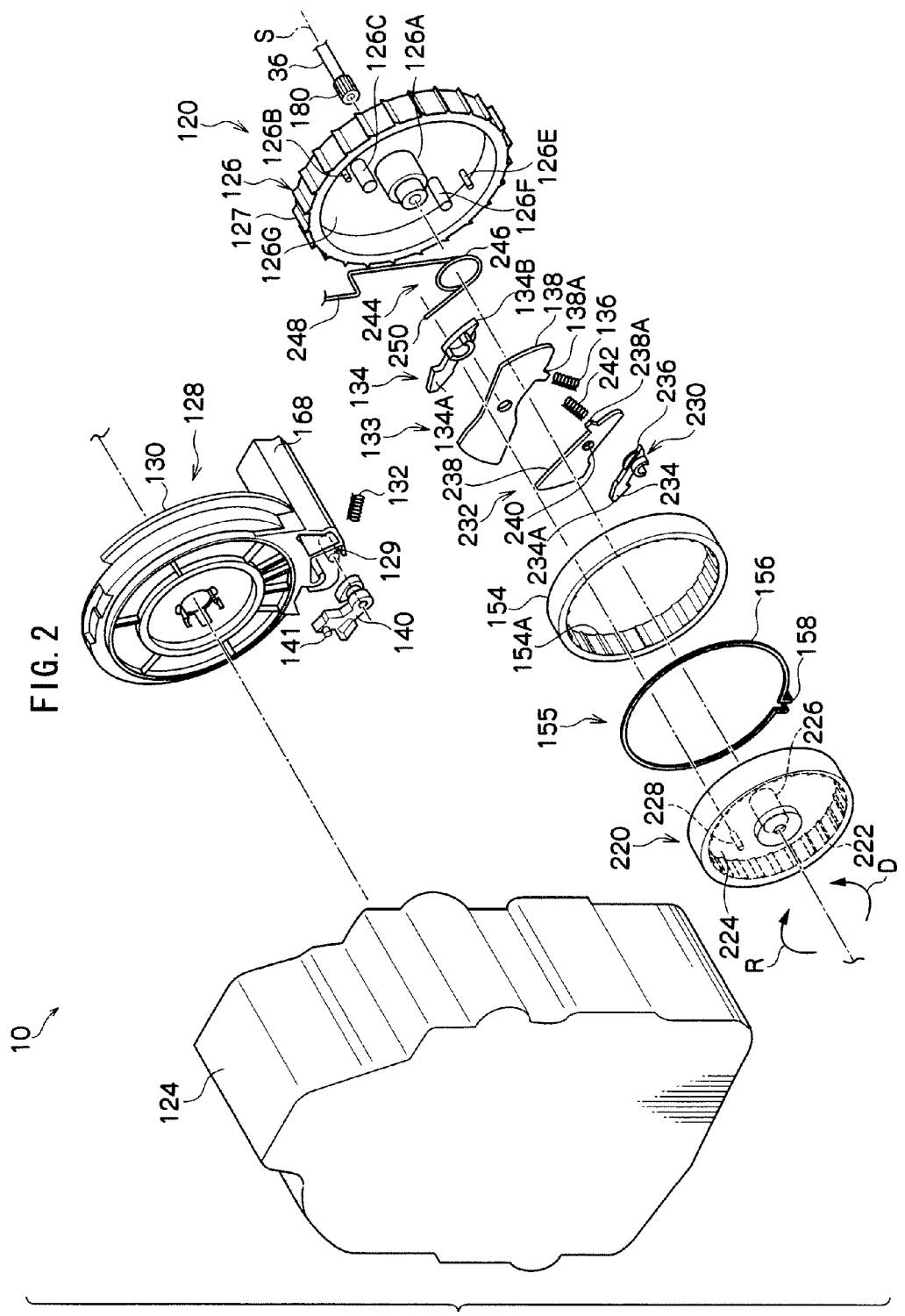
FIG. 2 is an exploded perspective view showing the structure of a locking mechanism of the webbing retractor shown in FIG. 1.

As shown in FIG. 2, a gear ring 154 is disposed at the webbing retractor 10 so as to be adjacent to the axial direction outer side of the V-gear 126. The gear ring 154 is formed overall in an annular shape which is concentric with the V-gear 126. The gear ring 154 is inserted in at the inner peripheral side of the V-gear 126 and engages with a rotation supporting portion (not shown) provided at the V-gear 126. The rotation supporting portion supports the gear ring 154 coaxially with the V-gear 126 such that the gear ring 154 can undergo relative rotation to the V-gear 126. Plural (24 in the present exemplary embodiment) internal teeth 154C are formed at the inner peripheral surface of the gear ring 154. The internal teeth 154C are arrayed at the inner peripheral surface of the gear ring 154 at a uniform pitch (a 15° pitch) along the peripheral direction.

A braking shaft 126A, which is shaped as a solid cylinder having a circular cross section orthogonal to the axial direction, is formed integrally with the central portion of a floor plate portion 126G of the V-gear 126. The braking shaft 126A projects-out toward the axial direction outer side from the floor plate portion 126G of the V-gear 126. Further, a lever-shaped W-pawl 134 and a webbing sensor mechanism 133 for driving the W-pawl 134 are disposed at the floor plate portion 126G of the V-gear 126, between the inner peripheral surface of the V-gear 126 and the braking shaft 126A. An anchor claw 134A, which corresponds to the internal teeth 154C of the gear ring 154, is formed at the distal end portion of the W-pawl 134. The proximal end portion of the W-pawl 134 is connected to the V-gear 126 via a connecting shaft 126B which stands erect at the floor plate portion 126G in parallel with the axial center S. The W-pawl 134 is supported so as to be able to swing, around the connecting shaft 126B, between a predetermined connected position (see FIG. 4) and connection released position (see FIG. 3). Moreover, a lever portion 134B, which extends out toward the outer peripheral side with respect to the connecting shaft 126B, is formed integrally with the W-pawl 134 at the end portion thereof at the opposite side of the anchor claw 134A.

Figure 3:
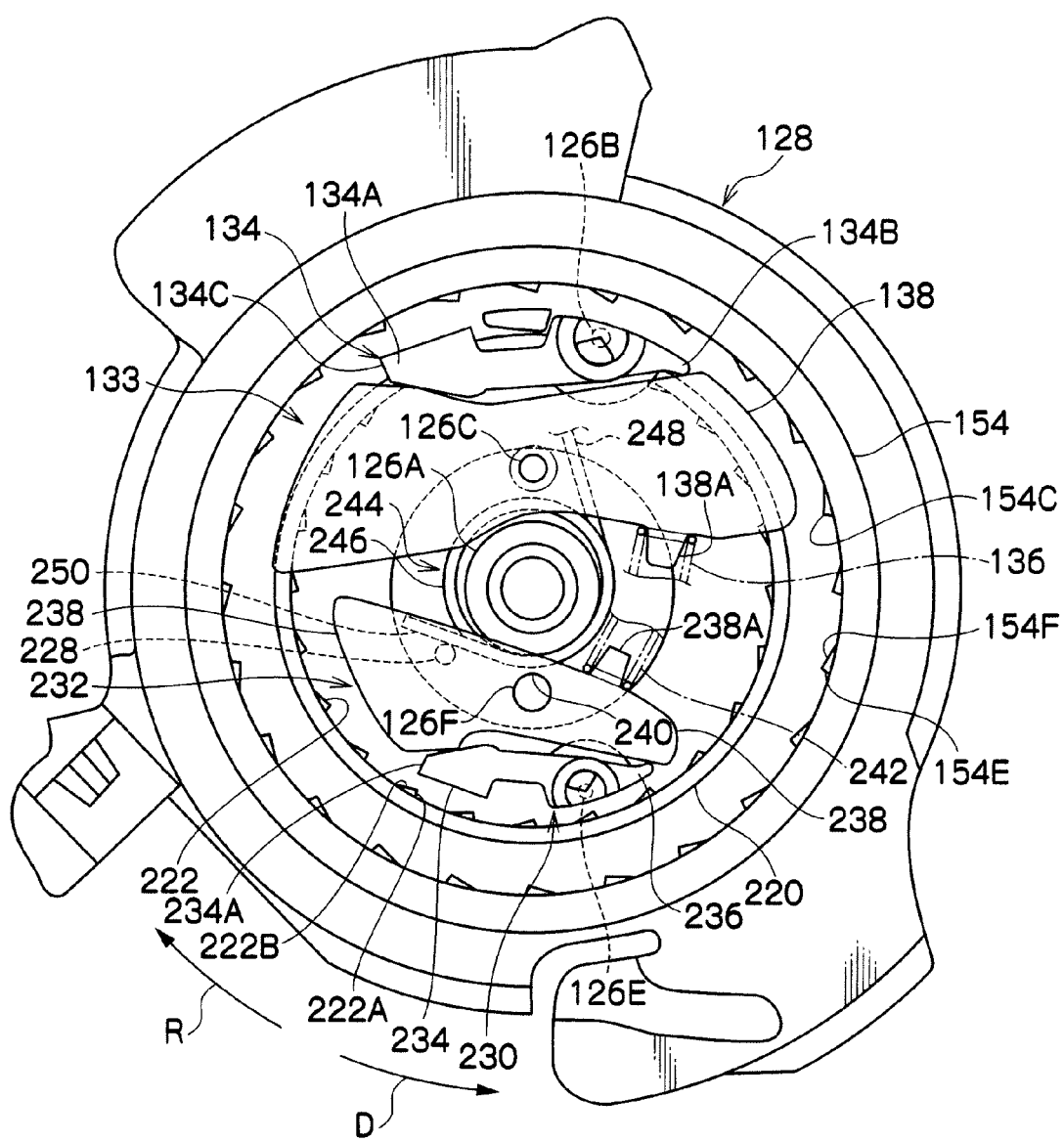
FIG. 3 is a plan view showing the structures of a V-gear, a gear ring, and a braking gear in the webbing retractor shown in FIG. 1, and shows a state in which a W-pawl, which is disposed at the V-gear, is at a non-connected position, and a braking pawl is at a separated position.

As shown in FIG. 3, the distal end surface of the anchor claw 134A is a tooth surface 134C which has a predetermined angle of inclination with respect to the direction tangent to the pitch circle of the internal teeth 154C of the gear ring 154. The take-up direction side end surfaces of the internal teeth 154C are tooth surfaces 154E which correspond to the tooth surface 134C of the anchor claw 134A. The pull-out direction sides of the tooth surfaces 154E are inclined surfaces 154F whose angle of inclination with respect to the direction tangent to the pitch circle is sufficiently small. The tooth surfaces 154E have a predetermined angle of inclination with respect to the direction tangent to the pitch circle. In the state in which the W-pawl 134 is at the connected position as shown in FIG. 4, the tooth surface 154E abuts the tooth surface 134C of the W-pawl 134.

At the webbing retractor 10, when the W-pawl 134 is at the connection released position as shown in FIG. 3, the anchor claw 134A of the W-pawl 134 is separated, toward the inner peripheral side, from the internal teeth 154C of the gear ring 154. In this way, the gear ring 154 does not receive interference from the V-gear 126, and relative rotation in both the pull-out direction (the direction of arrow D) and the take-up direction (the direction of arrow R) is possible.

Figure 4:
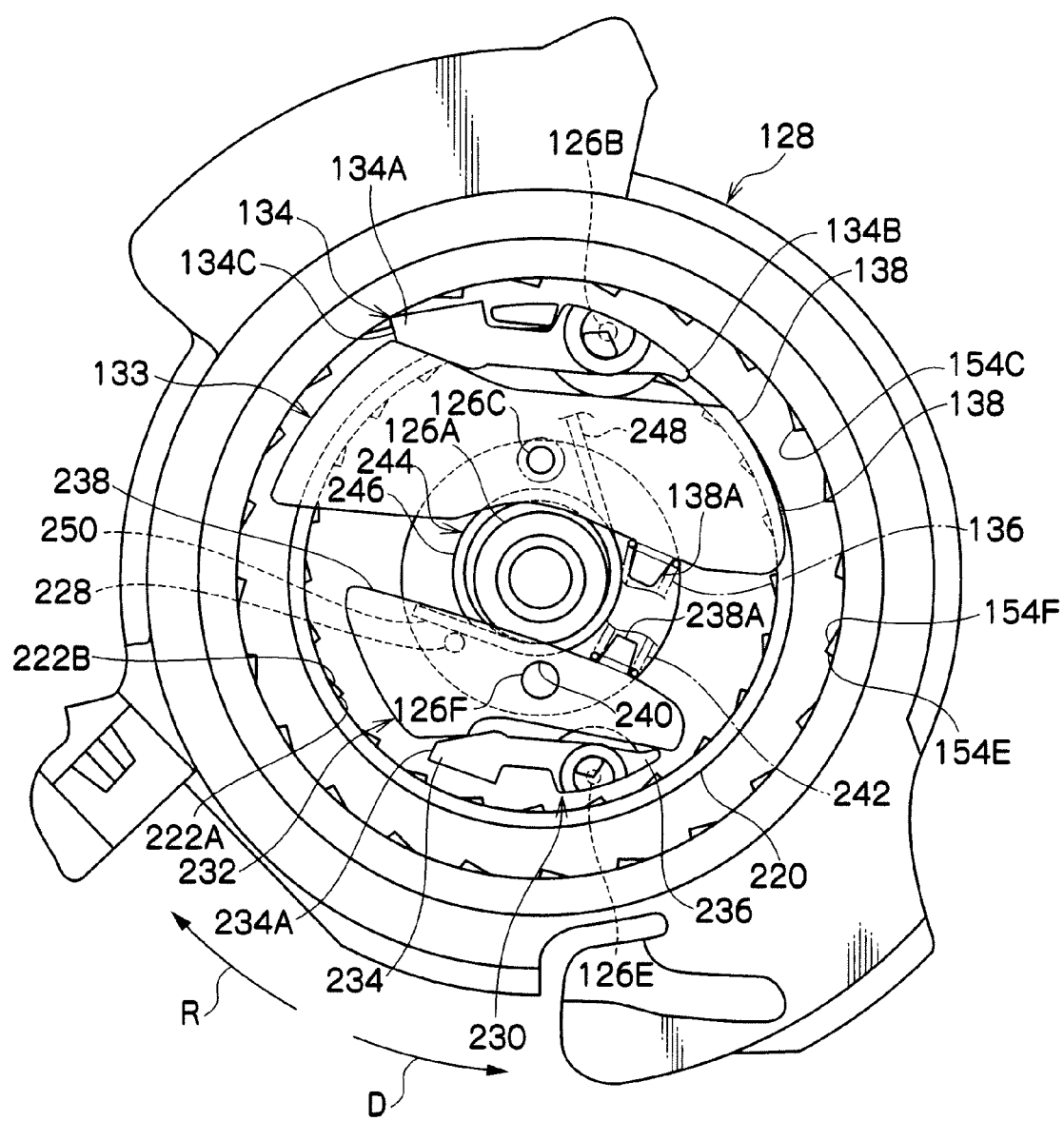
FIG. 4 is a plan view showing the structures of the V-gear, the gear ring, and the braking gear in the webbing retractor shown in FIG. 1, and shows a state in which the W-pawl, which is disposed at the V-gear, is at a connected position, and the braking pawl is at the separated position.

Further, at the webbing retractor 10, when the W-pawl 134 is at the connected position as shown in FIG. 4, the anchor claw 134A of the W-pawl 134 meshes with the internal tooth 154C of the gear ring 154, and the tooth surface 134C of the W-pawl 134 abuts the tooth surface 154E of the internal tooth 154C. The V-gear 126 is thereby connected to the gear ring 154 via the W-pawl 134.

At this time, when the V-gear 126 rotates in the pull-out direction relative to the gear ring 154, torque in the pull-out direction is transmitted from the V-gear 126 to the gear ring 154, and the V-gear 126 and the gear ring 154 rotate integrally in the pull-out direction. Further, the respective angles of inclination of the tooth surface 134C of the W-pawl 134 and the tooth surface 154E of the internal tooth 154C are set so that they engage with one another. In this way, at the time when torque in the pull-out direction is transmitted, a component of force (torque) toward the axial center S acts on the W-pawl 134, and, due to this torque, the anchor claw 134A is maintained in a state of reliably engaging with the internal tooth 154C.

Oppositely of the above-described case, when the V-gear 126 rotates in the take-up direction relative to the gear ring 154, the anchor claw 134A rides along the inclined surface 154F and over the internal tooth 154C. Therefore, torque in the take-up direction is not transmitted from the V-gear 126 to the gear ring 154, and only the V-gear 126 rotates (idly rotates) in the take-up direction with respect to the gear ring 154.

As shown in FIG. 3, the webbing sensor mechanism 133 is disposed between the W-pawl 134 and the pivot portion 126A of the V-gear 126, and has an inertial body 138 and a sensor spring 136. The inertial body 138 is formed in the shape of a slender plate with the axial center S at the inner peripheral side thereof. The longitudinal direction central portion of the inertial plate 138 is connected to the V-gear 126 via a connecting shaft 126C which stands erect in parallel to the axial center S. The inertial body 138 is supported so as to be able to swing around the connecting shaft 126C between a predetermined non-operating position (see FIG. 3) and an operating position (see FIG. 4).

One end of the sensor spring 136 is anchored on the inertial body 138, and urges the inertial body 138 in the non-operating direction which is opposite the swinging direction (i.e., engaging direction) of the inertial body 138 at the time when the inertial body 138 pushes the W-pawl 134 and swings the W-pawl 134.

The one longitudinal direction end side at the outer peripheral end surface of the inertial body 138 which is at the non-operating position press-contacts the lever portion 134B of the W-pawl 134, and transmits the urging force of the sensor spring 136 to the W-pawl 134. In this way, the W-pawl 134 is held at the connection released position by the urging force of the sensor spring 136. Further, as shown in FIG. 4, when the inertial body 138 moves from the non-operating position to the operating position against the urging force of the sensor spring 136, a vicinity of the anchor claw 134A of the W-pawl 134 is pushed toward the outer peripheral side by the longitudinal direction other end side at the outer peripheral end surface, and the W-pawl 134 is moved from the connection released position to the connected position.

As shown in FIG. 2, the webbing retractor 10 has a friction spring 155 which is formed from an elastic wire which is formed in a substantial ring shape. A main body portion 156, which is curved in a C-shape and has a given radius of curvature around the axial center S, is formed at the friction spring 155. The inner diameter of the main body portion 156 is formed to be substantially the same as or slightly smaller than the outer diameter of the gear ring 154, and the main body portion 156 is fit on the outer peripheral side of the gear ring 154. At this time, the main body portion 156 is held in a state of being flexurally deformed by a predetermined amount toward the outer peripheral side by the outer peripheral surface of the gear ring 154.

The main body portion 156 can rotate relative to the gear ring 154, and press-contacts the outer peripheral surface of the gear ring 154 due to the restoring force of the flexural deformation thereof. Provided that torque which impedes integral rotation with the gear ring 154 is not applied to the friction spring 155, the main body portion 156 rotates integrally with the gear ring 154.

As shown in FIG. 2, a substantially disc-shaped sensor gear 128 is provided at the webbing retractor 10 at the axial direction outer side of the V-gear 126. The torsion shaft 36 passes coaxially through a main body portion 130 of the sensor gear 128. The main body portion 130 of the sensor gear 128 is pivotally-supported by the torsion shaft 36 so as to rotate freely. One end of a return spring 132 is anchored on a portion of the outer peripheral side of the sensor gear 128. The return spring 132 is a tension coil spring. The other end thereof is anchored on the sensor cover 124. The return spring 132 urges the sensor gear 128 in the take-up direction at the time when the sensor gear 128 rotates in the pull-out direction around the torsion shaft 36.

A pushing portion 168, which projects-out toward the V-gear 126, is formed at the outer peripheral portion of the main body portion 130 of the sensor gear 128. A shaft 129 is formed so as to project-out parallel to the axial center S at the end portion of the pushing portion 168 which end portion is at the side opposite the V-gear 126. The shaft 129 rotatably supports a V-pawl 140. Due to the V-pawl 140 rotating, the V-pawl 140 approaches and moves away from the ratchet teeth 127 of the V-gear 126. In the state in which the V-pawl 140 has contacted and engaged with the ratchet tooth 127 of the V-gear 126, if the V-gear 126 is rotating in the pull-out direction, the rotation (torque) of the V-gear 126 in the pull-out direction is transmitted to the sensor gear 128 via the V-pawl 140, and the sensor gear 128 rotates integrally with the V-gear 126 in the pull-out direction.

As shown in FIG. 1, a vehicle sensor 142 serving as a deceleration detecting means is provided beneath the V-pawl 140. When a predetermined deceleration acts on the vehicle, the vehicle sensor 142 senses the deceleration, and pushes the V-pawl 140 shown in FIG. 2 upward such that that the V-pawl 140 meshes with the ratchet tooth 127 of the V-gear 126.

The locking mechanism 120 has a lock pawl 160 shown in FIG. 1. Shafts 162 stand erect at both axial direction outer side end surfaces of the lock pawl 160. The axial directions of the shafts 162 are a direction parallel to (the same direction as) the axial direction of the spool 24. One of the shafts 162 is pivotally-supported so as to rotate freely at a shaft-receiving hole (not shown) which is formed in the leg plate 18. The other of the shafts 162 is pivotally-supported so as to rotate freely at a shaft-receiving hole 164 which is formed in the gear case 70. A pawl portion 166 is formed at the axial direction other end side of the lock pawl 160. The pawl portion 166 is a plate-shaped member whose direction of thickness is the axial direction of the shafts 162. A pair of lock teeth 166A are formed at the distal end portion of the outer peripheral side of the pawl portion 166.

As shown in FIG. 1, a ratchet wheel 170 is provided at the side of the pawl portion 166 along the rotation radius direction of the shafts 162. The ratchet wheel 170 has a fit-in portion 171. The fit-in portion 171 is formed in the shape of a solid cylinder, and is fit-into the other end portion of the through-hole 28 of the spool 24 coaxially with respect to the spool 24 and so as to rotate freely. The torsion shaft 36 coaxially passes through the ratchet wheel 170 in a rotation-prevented state, and rotates coaxially and integrally with the torsion shaft 36.

A ratchet portion 172 is formed integrally with the leg plate 16 side of the fit-in portion 171. The ratchet portion 172 is formed coaxially with the fit-in portion 171. Ratchet teeth 172A, which can mesh-together with the lock teeth 166A of the lock pawl 166, are formed at the outer peripheral surface of the ratchet portion 172. The same number (24) of ratchet teeth 172A as the number of internal teeth 154C of the gear ring 154 are arrayed at the ratchet portion 172 at a uniform pitch (a 15° pitch) along the peripheral direction.

Due to the shafts 162 of the lock pawl 160 rotating in the take-up direction, the lock teeth 166A of the pawl portion 166 mesh with the ratchet teeth 172A of the ratchet portion 172. In the state in which the pawl portion 166 and the ratchet portion 172 are meshed-together, rotation of the ratchet wheel 170 in the pull-out direction (the direction of arrow D) is restrained. Further, the pushing portion 168 of the sensor gear 128 shown in FIG. 2 corresponds to the pawl portion 166. When the main body portion 130 of the sensor gear 128 rotates in the pull-out direction, the pushing portion 168 pushes the pawl portion 166 and rotates the lock pawl 160 in the take-up direction (the direction of meshing with the ratchet wheel 170).

As shown in FIG. 3, at the webbing retractor 10, a braking gear 220 is disposed at the inner peripheral side of the gear ring 154 at the axial direction outer side of the V-gear 126. As shown in FIG. 2, the braking gear 220 is formed in the shape of a shallow cylindrical tube having a floor, and opens toward the V-gear 126 side. Plural (24 in the present exemplary embodiment) internal teeth 222 are formed at the inner peripheral surface of the braking gear 220. The internal teeth 222 are arrayed at the inner peripheral surface of the braking gear 220 at a uniform pitch (a 15° pitch) along the peripheral direction. A disc-shaped floor plate portion 224, which closes the axial direction outer side end surface, is formed at the braking gear 220. A shaft-supporting portion 226, which is shaped as a thick-walled cylindrical tube and projects-out toward the V-gear 126 side, is formed integrally at the central portion of the floor plate portion 224.

The torsion shaft 36 is inserted-in at the inner peripheral side of the shaft-supporting portion 226 so as to be able to rotate relatively. In this way, the braking gear 220 is supported coaxially with the torsion shaft 36, and can rotate relative thereto. Further, a circular-rod-shaped anchor pin 228 which projects-out toward the V-gear 126 is formed at the floor plate portion 224 of the braking gear 220, at an intermediate portion between the shaft supporting portion 226 and the internal teeth 222.

A connecting shaft 126E stands erect at the floor plate portion 126G of the V-gear 126 so as to project-out toward the braking gear 220 in parallel to the axial center S. The connecting shaft 126E is disposed at the side of the braking shaft 126A opposite the side at which the connecting shaft 126B is located. Further, a connecting shaft 126F stands erect in parallel to the axial center S, at the floor plate portion 126G of the V-gear 126 at the outer peripheral side of the connecting shaft 126E.

As shown in FIG. 3, a lever-shaped braking pawl 230 and a pawl driving mechanism 232, which is for driving the braking pawl 230, are disposed on the floor plate portion 126G of the V-gear 126 at the side of the braking shaft 126A which is opposite the side at which the W-pawl 134 and the inertial body 138 are located. An anchor claw 234, which corresponds to the internal teeth 222 of the braking gear 220, is formed at the distal end portion of the braking pawl 230. The proximal end side of the braking pawl 230 is connected to the V-gear 126 via the connecting shaft 126E. The braking pawl 230 is supported so as to be able to swing around the connecting shaft 126E between a predetermined meshing position (see FIG. 5) and a connection released position (see FIG. 3). Further, a lever portion 236, which extends-out toward the outer peripheral side with respect to the connecting shaft 126E, is formed integrally with the end portion of the braking pawl 230 at the side opposite the anchor claw 234.

As shown in FIG. 3, the distal end surface of the anchor claw 234 is a tooth surface 234A which can engage with the internal teeth 222 at the braking gear 220. Further, the pull-out direction side end surfaces of the internal teeth 222 are tooth surfaces 222A which correspond to the tooth surface 234A of the anchor claw 234. The take-up direction side end surfaces of the tooth surfaces 222A are inclined surfaces 222B. In the state in which the braking pawl 230 is at the meshing position as shown in FIG. 5, the tooth surface 222A abuts the tooth surface 234A of the braking pawl 230.

At the webbing retractor 10, when the braking pawl 230 is at the connection released position as shown in FIG. 3, the anchor claw 234 of the braking pawl 230 is separated, toward the inner peripheral side, from the internal teeth 222 of the braking gear 220. In this way, the braking gear 220 does not receive interference from the V-gear 126, and the braking gear 220 can rotate in both the pull-out direction (the direction of arrow D) and the take-up direction (the direction of arrow R).

Figure 5:
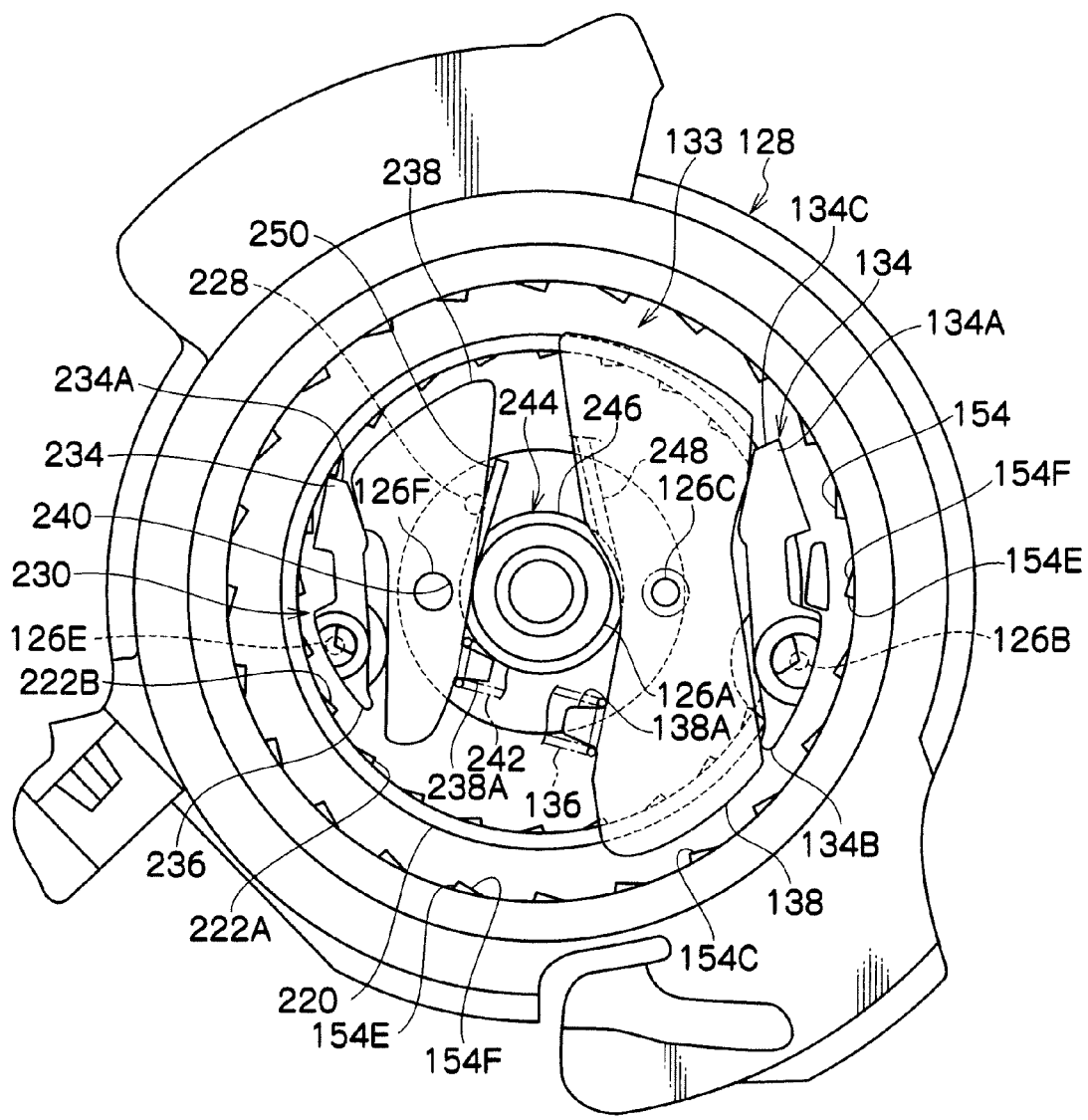
FIG. 5 is a plan view showing the structures of the V-gear, the gear ring, and the braking gear in the webbing retractor shown in FIG. 1, and shows a state in which the W-pawl, which is disposed at the V-gear, is at the non-connected position, and the braking pawl is at a meshing position.

At the webbing retractor 10, when the braking pawl 230 is at the meshing position as shown in FIG. 5, the anchor claw 234 of the braking pawl 230 meshes with the internal tooth 222 of the braking gear 220, and the tooth surface 234A of the braking pawl 230 abuts the tooth surface 222A of the internal tooth 222. In this way, the V-gear 126 is connected to the braking gear 220 via the braking pawl 230.

At this time, if the V-gear 126 rotates in the take-up direction relative to the braking gear 220, torque in the take-up direction is transferred from the V-gear 126 to the braking gear 220, and the V-gear 126 and the braking gear 220 rotate integrally in the take-up direction. Oppositely to this case, if the V-gear 126 rotates in the pull-out direction relative to the braking gear 220, the anchor claw 234 rides along the inclined surface 222B and over the internal tooth 222. Therefore, torque in the pull-out direction is not transmitted from the V-gear 126 to the braking gear 220, and only the V-gear 126 rotates (rotates idly) in the pull-out direction with respect to the braking gear 220.

As shown in FIG. 3, the pawl driving mechanism 232 is disposed between the braking shaft 126A and the braking pawl 230 at the V-gear 126, and has a mass body 238 and a sensor spring 242. The mass body 238 is formed in the shape of a slender plate along the direction of a chord whose center is the axial center S. A round shaft-supporting hole 240 is formed in the intermediate portion in the longitudinal direction of the mass body 238. Here, the shaft-supporting hole 240 is disposed at a region which is displaced toward one longitudinal direction end side with respect to the center of gravity of the mass body 238. The connecting shaft 126F of the V-gear 126 is fit-in the shaft-supporting hole 240 so as to be able to rotate relative thereto. In this way, the mass body 238 is connected to the V-gear 126 via the connecting shaft 126F, and is supported so as to be able to swing around the connecting shaft 126F between a predetermined non-operating position (see FIG. 3) and an operating position (see FIG. 5).

A projection-shaped seat receiving portion 238A is formed at one longitudinal direction end side of the inner peripheral side end surface of the mass body 238. A projection-shaped seat receiving portion (not shown) is formed at the V-gear 126 so as to directly oppose the seat receiving portion 238A. The sensor spring 242 is interposed in a compressed state between the seat receiving portion 238A of the mass body 238 and the seat receiving portion of the V-gear 126. In this way, the mass body 238 is always urged toward the non-operating position by the urging force of the sensor spring 242.

One longitudinal direction end side at the outer peripheral side end surface of the mass body 238, which is at the non-operating position, press-contacts the lever portion 236 of the braking pawl 230, and transfers the urging force of the sensor spring 242 to the braking pawl 230. The braking pawl 230 is thereby held at the connection released position by the urging force of the sensor spring 242. Further, as shown in FIG. 5, when the mass body 238 moves from the non-operating position to the operating position against the urging force of the sensor spring 242, a vicinity of the anchor claw 234 of the braking pawl 230 is pushed toward the outer peripheral side by the longitudinal direction other end side of the outer peripheral end surface of the mass body 238, such that the mass body 238 moves the braking pawl 230 from the connection released position to the meshing position.

At the webbing retractor 10, when the V-gear 126 is rotating in the take-up direction at an angular velocity which is less than an upper limit angular velocity VH which is set in advance, the mass body 238 disposed at the V-gear 126 is held at the non-operating position by the urging force of the sensor spring 242. Namely, at the time when the V-gear 126 rotates, centrifugal force acts as torque toward the operating position on the mass body 238 whose center of rotation is at a region displaced from the center of gravity thereof. At an angular velocity of less than the upper limit angular velocity VH, this torque is smaller than the urging force of the sensor spring 242 which acts on the mass body 238 as torque toward the non-operating position side.

On the other hand, at the webbing retractor 10, when the V-gear 126 rotates in the take-up direction at an angular velocity which is greater than or equal to the upper limit angular velocity VH which is set in advance, the mass body 238 disposed at the V-gear 126 swings, due to centrifugal force, from the non-operating position to the operating position against the urging force of the sensor spring 242. Namely, when the V-gear 126 rotates at an angular velocity of greater than or equal to the upper limit angular velocity VH, torque toward the operating position, which arises due to the centrifugal force of the mass body 238, is greater than the urging force of the sensor spring 242 which acts on the mass body 238 as torque toward the non-operating position.

As shown in FIG. 3, the webbing retractor 10 has a torsion coil spring 244 which is disposed at the outer peripheral side of the braking shaft 126A of the V-gear 126. The torsion coil spring 244 is formed by using an elastic, slender, metal wire as the material thereof. Due to the metal wire being wound in a spiral shape at the longitudinal direction intermediate portion thereof, a substantially cylindrical-tubular coil portion 246 is formed. Further, a pair of arm portions 248, 250, which extend-out toward the outer peripheral side from the both axial direction end portions of the coil portion 246, are formed at the torsion coil spring 244.

The torsion coil spring 244 structures a decelerating member for applying rotation resistance to the outer peripheral surface of the braking shaft 126A. The coil portion 246 of the torsion coil spring 244 is fit-on the outer peripheral side of the braking shaft 126A. As shown in FIG. 3, a gap is formed, over almost the entire periphery, between the outer peripheral surface of the braking shaft 126A and the inner peripheral surface of the coil portion 246 (the inner peripheral end of the metal wire) which is in a neutral state in which it is not deformed in the twisting direction. As shown in FIG. 2, the one arm portion 248 of the torsion coil spring 244 extends-out to the outer peripheral side of the V-gear 126, and the distal end portion thereof is connected and fixed to a connecting portion (not shown) which is formed at the inner surface of the sensor cover 124.

As shown in FIG. 3, the anchor pin 228, which projects-out from the floor plate portion 224 of the braking gear 220, press-contacts, from the take-up direction, the other arm portion 250 of the tension coil spring 244. In this way, when the braking gear 220 rotates in the take-up direction, the arm portion 250 of the torsion coil spring 244 is pushed in the take-up direction by the anchor pin 228, and torsional deformation centered around a vicinity of the axial center S arises at the coil portion 246. As shown in FIG. 5, the coil portion 246 elastically deforms such that the inner diameter thereof contracts accompanying the torsional deformation, and the inner peripheral surface thereof (the inner peripheral end of the metal wire) press-contacts the outer peripheral surface of the braking shaft 126A. At this time, as the amount of torsional deformation of the coil portion 246 increases, the press-contact force of the coil portion 246 with respect to the braking shaft 126A increases.

(Operation of Present Exemplary Embodiment)

The operation of the webbing retractor 10 relating to the present exemplary embodiment will be described next. At the webbing retractor 10, when the distal end side of the webbing belt 30, which is in a state of being taken-up on the spool 24, is pulled against the urging force of the spiral spring 40, the spool 24 rotates in the pull-out direction as the webbing belt 30 is pulled-out toward the outer peripheral side. The webbing belt 30, which is pulled-out in this way, is placed around the body of a vehicle occupant, and is set in a state of being applied to the body of the vehicle occupant by, for example, a tongue plate, which is provided at the longitudinal direction intermediate portion of the webbing belt 30, being made to be held in a buckle device which is provided at the side of a vehicle seat, such that the body of the vehicle occupant is restrained by the webbing belt 30.

At the webbing retractor 10, in the state in which the webbing belt 30 is applied to the vehicle occupant, the vehicle enters into a state of rapid deceleration, and the vehicle sensor 142 thereby operates and engages with the V-pawl 140 of the sensor gear 128 and rotates the V-pawl 140 so as to push the V-pawl 140 upward. The V-pawl 140 thereby meshes with the V-gear 126.

On the other hand, when the body of the vehicle occupant moves substantially toward the front side of the vehicle due to inertia at the time when the vehicle decelerates, the webbing belt 30 is suddenly pulled by the body of the vehicle occupant. Due to the webbing belt 30 being pulled suddenly in this way, rotational force in the pull-out direction is suddenly applied to the spool 24.

Basically, when the torsion shaft 36 and the V-gear 126 rotate in the pull-out direction due to the spool 24 rotating in the pull-out direction, the inertial body 138, which is held at the non-operating position (see FIG. 3) by the sensor spring 136, rotates together with the V-gear 126 in the pull-out direction. However, in a case in which the spool 24 suddenly rotates in the pull-out direction as described above, and at this time, the angular acceleration of the spool 24 exceeds an angular acceleration αx which is set in advance, the inertial body 138 attempts, due to inertia, to remain at that position without rotating. In this way, the inertial body 138 rotates around the connecting shaft 126C toward the operating position (see FIG. 4) relative to the V-gear 126 against the urging force of the sensor spring 136. When the inertial body 138 rotates to the operating position, the W-pawl 134 rotates from the connection released position (see FIG. 3) to the connected position (see FIG. 4) due to the inertial body 138, and the anchor claw 134A of the W-pawl 134 meshes with the internal tooth 154C of the gear ring 154.

At the webbing retractor 10, due to the anchor claw 134A of the W-pawl 134 meshing with the internal tooth 154C of the gear ring 154, the torque of the V-gear 126 in the pull-out direction is transferred to the gear ring 154 via the W-pawl 134, and the gear ring 154 rotates integrally with the V-gear 126 in the pull-out direction.

Due to the gear ring 154 rotating in the pull-out direction, the friction spring 155 which is press-contacting the outer peripheral surface of the gear ring 154 rotates integrally with the gear ring 154 in the pull-out direction. In this way, when the friction spring 155 rotates by a predetermined angle in the pull-out direction, the pushing portion 158 of the friction spring 155 abuts an engaging pin 141 of the V-pawl 140 and pushes the engaging pin 141. The engaging pin 141 of the V-pawl 140 thereby rotates toward the V-gear 126, and the V-pawl 140 meshes with the ratchet tooth 127 of the V-gear 126.

At the webbing retractor 10, when the V-pawl 140 meshes with the ratchet tooth 127 of the V-gear 126, the sensor gear 128 is connected to the V-gear 126 via the V-pawl 140, and torque in the pull-out direction is transferred from the V-gear 126 to the sensor gear 128. Therefore, the sensor gear 128 rotates in the pull-out direction.

When the sensor gear 128 rotates by a given angle in the pull-out direction against the urging force of the return spring 132, the pushing portion 168 provided at the sensor gear 128 pushes the pawl portion 166 of the lock pawl 160, and rotates the pawl portion 166 around the shafts 162.

When the pawl portion 166 rotates around the shafts 162 in this way, the pawl portion 166 meshes with the ratchet portion 172 of the ratchet wheel 170, and restrains rotation of the ratchet wheel 170 and the spool 24 in the pull-out direction. In this way, the body of the vehicle occupant, which is attempting to inertially move substantially toward the front of the vehicle, can be reliably restrained and held by the webbing belt 30.

Further, in the above-described webbing retractor 10 relating to the present exemplary embodiment, when the V-gear 126 is rotating in the take-up direction at an angular velocity which is less than the upper limit angular velocity VH which is set in advance, the mass body 238 disposed at the V-gear 126 is held at the non-operating position by the urging force of the sensor spring 242, and the braking pawl 230 is held at the separated position (see FIG. 3) by the mass body 238. When the V-gear 126 rotates in the take-up direction at an angular velocity which is greater than or equal to the upper limit angular velocity VH which is set in advance, the mass body 238 disposed at the V-gear 126 swings due to centrifugal force from the non-operating position to the operating position against the urging force of the sensor spring 242, and the braking pawl 230 swings from the separated position to the meshing position due to the mass body 238.

Then, at the webbing retractor 10, when the braking pawl 230 moves to the meshing position, the anchor claw 234 of the braking pawl 230 meshes with the internal tooth 222 of the braking gear 220, and the braking gear 220 is connected via the braking pawl 230 to the V-gear 126 so as to rotate integrally therewith in the take-up direction. Due thereto, the braking gear 220 rotates in the take-up direction, and the coil portion 246 of the torsion coil spring 244 is twisted in the take-up direction (the diameter contracting direction) via the anchor pin 228. Therefore, the inner diameter of the coil portion 246 contracts, and the inner peripheral surface of the coil portion 246 can be made to press-contact the outer peripheral surface of the braking shaft 126A.

In this way, at the webbing retractor 10, when the spool 24 rotates in the take-up direction at an angular velocity which is greater than or equal to the upper limit angular velocity VH, the coil portion 246 of the torsion coil spring 244 is made to press-contact the outer peripheral surface of the braking shaft 126A which rotates integrally with the spool 24, and can apply frictional force thereto. Therefore, rotation resistance acts on the spool 24 via the braking shaft 126A, and the rotational speed of the spool 24 in the take-up direction can be decelerated.

Accordingly, at the webbing retractor 10, the angular velocity of the spool 24, which rotates in the take-up direction due to the urging force of the spiral spring 40, can be controlled to less than or equal to the upper limit angular velocity VH. Therefore, even in a case in which the spool 24 which rotates in the take-up direction is suddenly decelerated immediately before the entire amount of the webbing belt 30 is taken-up onto the spool 24, if the upper limit angular velocity VH is appropriately set in accordance with the angular acceleration at which the inertial body 138 operates, the angular acceleration of the spool 24, which is decelerated immediately before the webbing belt 30 is taken-up, can reliably be maintained at less than or equal to the angular acceleration α.

As a result, in accordance with the webbing retractor 10, the spool 24 is rotated in the take-up direction by the urging force of the spiral spring, and the inertial body 138 can reliably be prevented from moving from the non-operating position to the operating position immediately before the entire amount of the webbing belt 30 is taken-up by the spool 24. Therefore, the occurrence of end locking can be reliably prevented.

Second Exemplary Embodiment

Structure of Exemplary Embodiment

Figure 6:
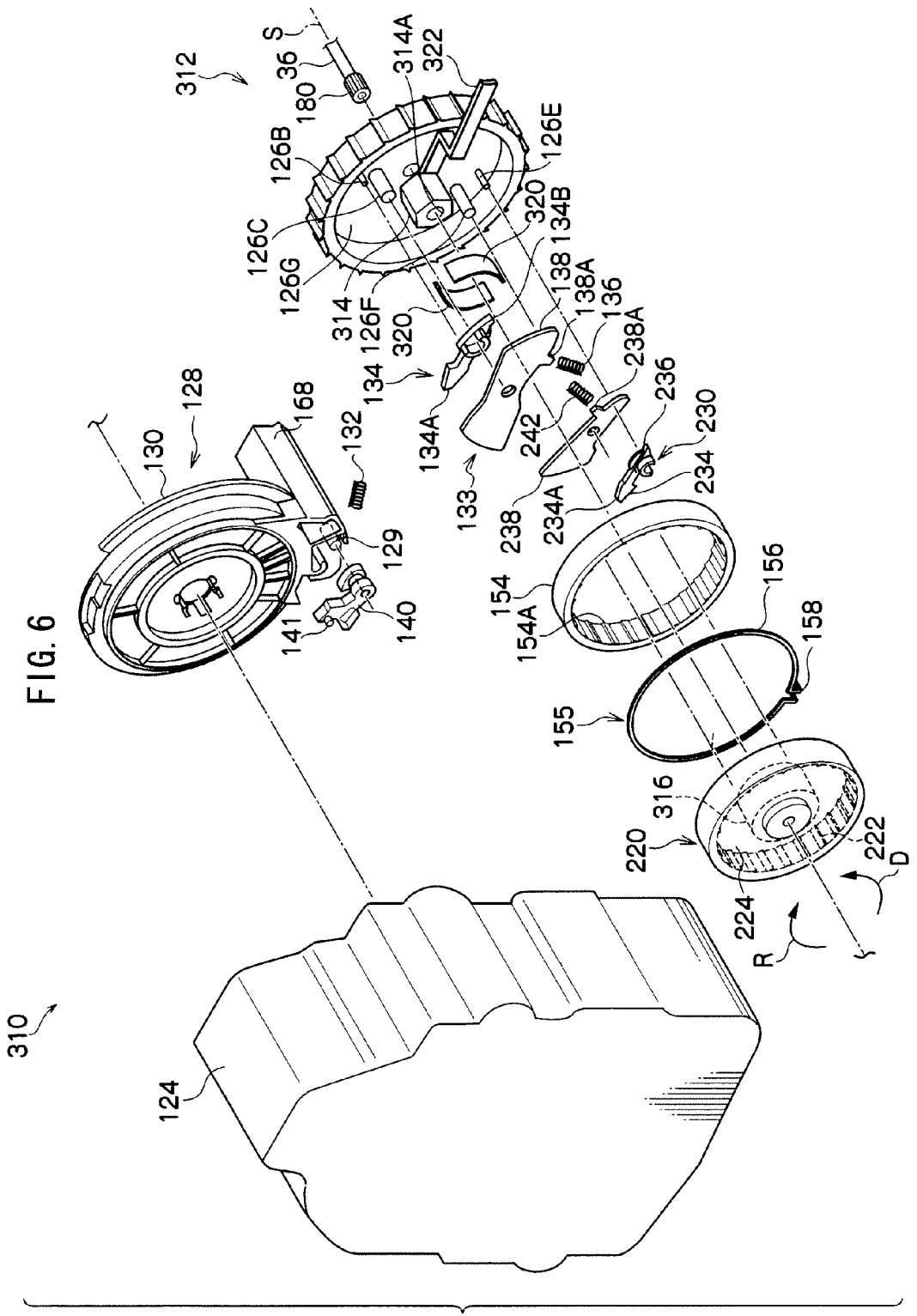
FIG. 6 is an exploded perspective view showing the structure of a locking mechanism in a webbing retractor relating to a second exemplary embodiment of the present invention.

The structure of a locking mechanism 312 in a webbing retractor 310 relating to a second exemplary embodiment of the present invention is shown in an exploded perspective view in FIG. 6. Note that, in the webbing retractor 310 relating to the present exemplary embodiment, portions which are the same as those of the webbing retractor 10 relating to the first exemplary embodiment are denoted by the same reference numerals, and description thereof is omitted.

The webbing retractor 310 relating to the present exemplary embodiment differs from the webbing retractor 10 relating to the first exemplary embodiment with regard to the following points: the point that the braking shaft 126A (see FIG. 2) which is formed integrally with the V-gear 126 in the webbing retractor 10 is omitted, and a braking shaft 314 which is structured as a part which is separate from the V-gear 126 is provided instead of the braking shaft 126A; the point that the shaft-supporting portion 226 (see FIG. 2) which is formed at the central portion of the braking gear 220 is omitted, and a holder portion 316 shaped as a large-diameter cylindrical tube is formed at the central portion of the braking gear 220 instead of the shaft-supporting portion 226; and the point that a pair of leaf springs 320 are disposed at the inner peripheral side of the holder portion 316.

The braking shaft 314 is disposed between the V-gear 126 and the braking gear 220 along the axial direction. A shaft-supporting hole, which passes-through in the axial direction, is formed in the central portion of the braking shaft 314. The torsion shaft 36 is fit-into this shaft-supporting hole so as to be able to rotate relatively. In this way, the braking shaft 314 is supported coaxially by the torsion shaft 36, and is able to rotate relative to the torsion shaft 36. The outer peripheral configuration of the cross-section of the braking shaft 314 along the direction perpendicular to the axis is hexagonal.

The distal end portion of a connecting stay 322, which is shaped as a slender plate, is fixed along the radial direction to the outer peripheral surface of the braking shaft 314. The proximal end portion of the connecting stay 322 extends-out toward the outer peripheral side of the V-gear 126 and is connected and fixed to a connecting portion (not shown) formed at the inner surface of the sensor cover 124. In this way, rotation (rotational movement around its own axis) of the braking shaft 314 around the torsion shaft 36 is restrained.

The cylindrical-tube-shaped holder portion 316 is formed coaxially with the central portion of the floor plate portion 224 at the braking gear 220. The inner diameter of the holder portion 316 is larger than the outer diameter (the maximum diameter) of the braking shaft 314, and the braking shaft 314 is inserted-in at the inner peripheral side of the holder portion 316. At this time, as shown in FIG. 7, a gap is formed over the entire periphery between the outer peripheral surface of the braking shaft 314 and the inner peripheral surface of the holder portion 316.

The pair of leaf springs 320 are disposed at the inner peripheral side of the holder portion 316. The leaf springs 320 are formed in the shapes of slender plates of an elastic metal material, resin, or the like. The leaf springs 320 are curved in arc-shapes along the longitudinal direction so as to be convex toward the outer peripheral side. On the other hand, slit-shaped fit-in grooves 318 are formed in the peripheral wall portion of the holder portion 316 at regions respectively corresponding to the both longitudinal direction end portions of the leaf springs 320. The inner peripheral side end portions of the fit-in grooves 318 respectively open toward the inner peripheral surface of the holder portion 316.

Figure 7:
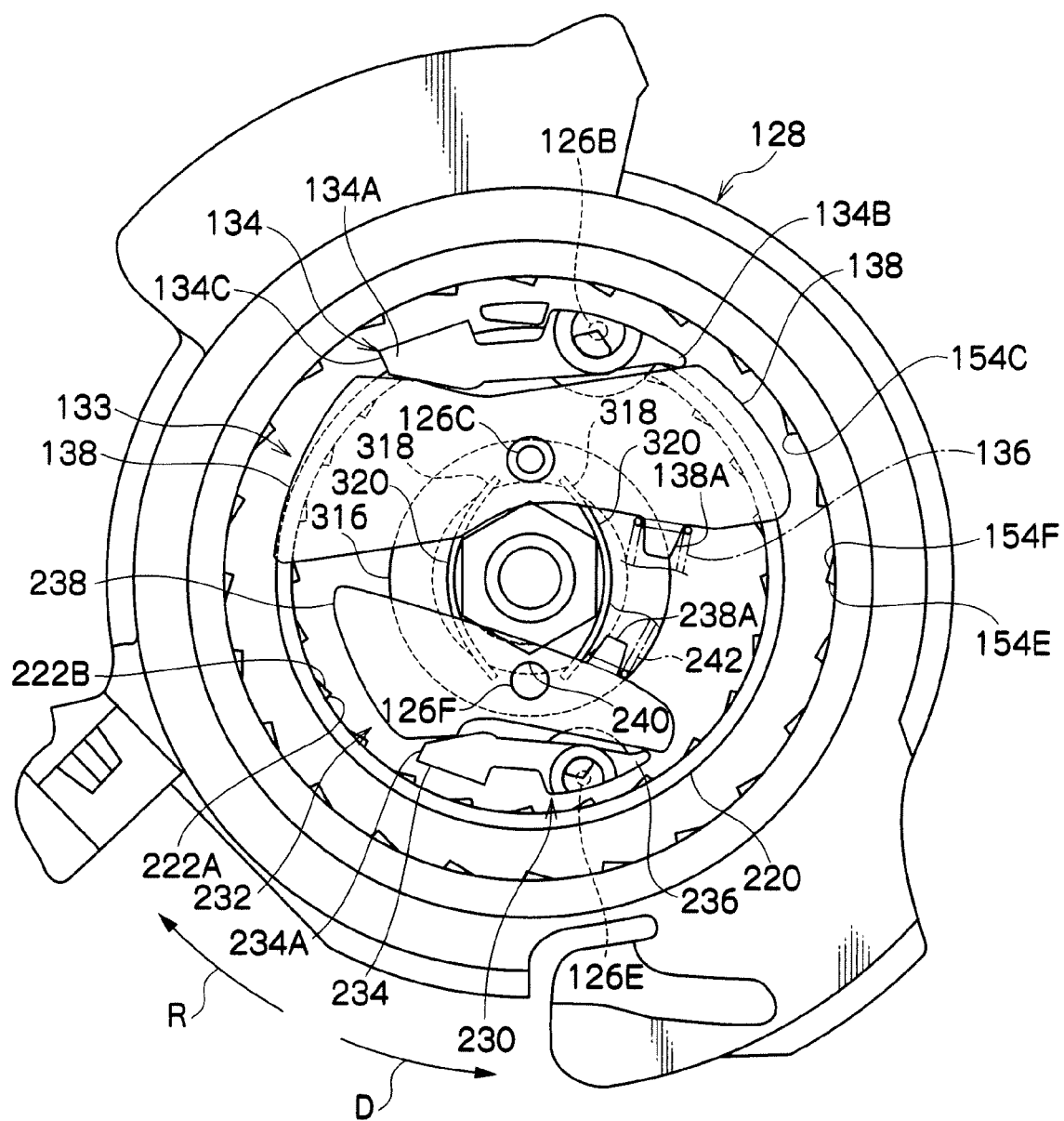
FIG. 7 is a plan view showing the structures of a V-gear, a gear ring, and a braking gear in the webbing retractor shown in FIG. 6, and shows a state in which a W-pawl, which is disposed at the V-gear, is at a non-connected position, and a braking pawl is at a separated position.

As shown in FIG. 7, the both longitudinal direction end portions of the leaf springs 320 are respectively fit into the pair of fit-in grooves 318 at the holder portion 316. In this way, the both longitudinal direction end portions of the leaf springs 320 are respectively supported by the peripheral wall portion of the holder portion 316, and the longitudinal direction central portions thereof are made to press-contact the outer peripheral surface of the braking shaft 314.

(Operation of the Present Exemplary Embodiment)

Operation of the webbing retractor 310 relating to the present exemplary embodiment will be described next. At the webbing retractor 310 as well, in a state in which the webbing belt 30 is applied to the vehicle occupant, in cases in which the vehicle enters a state of rapid deceleration or in cases in which the webbing belt 30 is suddenly pulled by the body of the vehicle occupant, operation which is basically the same as that of the webbing retractor 10 relating to the first exemplary embodiment is carried out. Therefore, description of such cases will be omitted.

Further, in the above-described webbing retractor 310 relating to the present exemplary embodiment, when the V-gear 126 is rotating in the take-up direction at an angular velocity which is less than the upper limit angular velocity VH which is set in advance, the mass body 238 disposed at the V-gear 126 is held at the non-operating position by the urging force of the sensor spring 242, and the braking pawl 230 is held at the separated position (see FIG. 3) by the mass body 238. When the V-gear 126 rotates in the take-up direction at an angular velocity which is greater than or equal to the upper limit angular velocity VH set in advance, the mass body 238 disposed at the V-gear 126 swings from the non-operating position to the operating position against the urging force of the sensor spring 242 due to centrifugal force, and the braking pawl 230 swings from the separated position to the meshing position due to the mass body 238.

Figure 8:
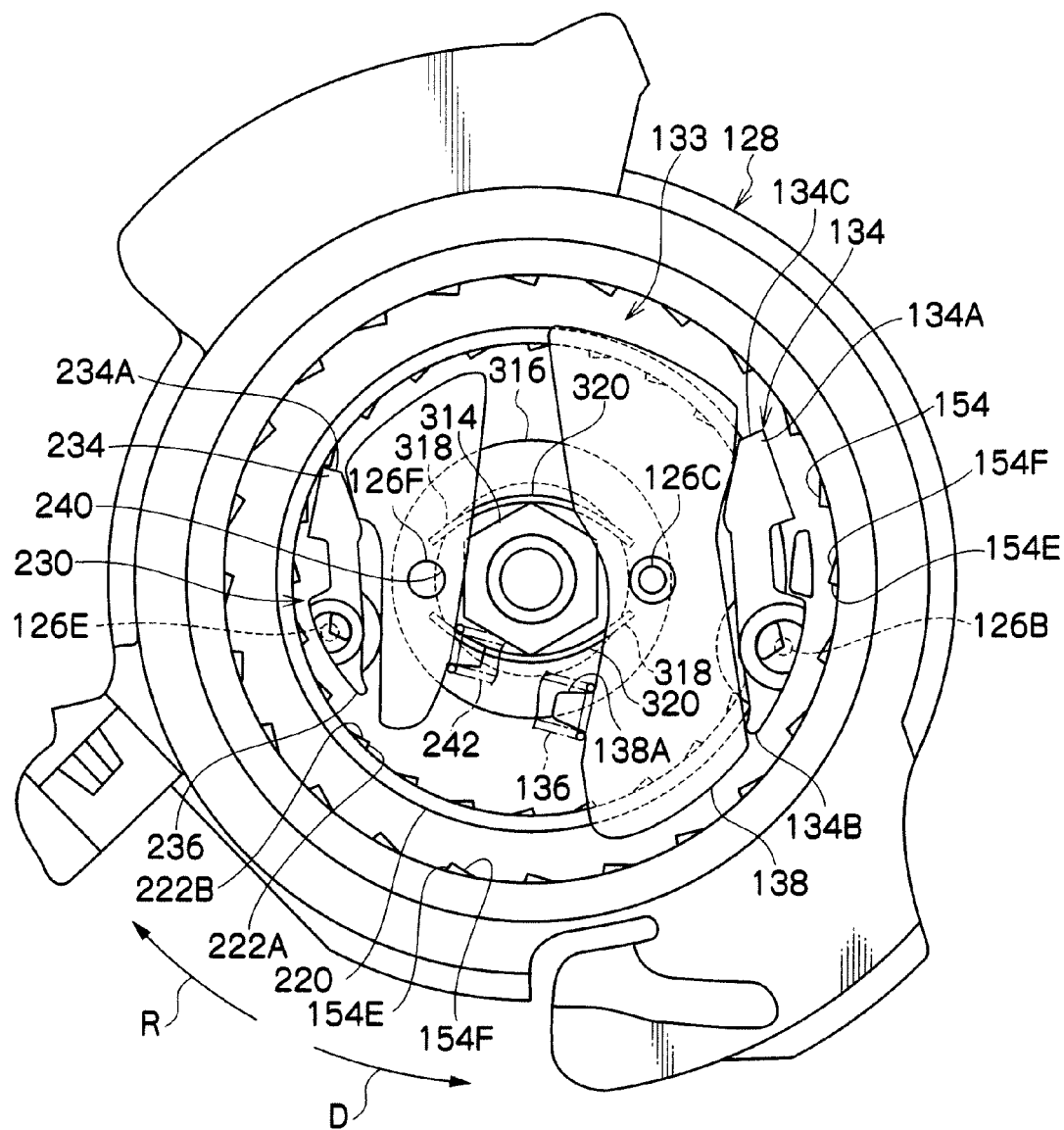
FIG. 8 is a plan view showing the structures of the V-gear, the gear ring, and the braking gear in the webbing retractor shown in FIG. 6, and shows a state in which the W-pawl, which is disposed at the V-gear, is at the non-connected position, and the braking pawl is at a meshing position.

Then, at the webbing retractor 310, when the braking pawl 230 moves to the meshing position, the anchor claw 234 of the braking pawl 230 meshes with the internal tooth 222 of the braking gear 220, and the braking gear 220 is connected to the V-gear 126 via the braking pawl 230 so as to rotate integrally in the take-up direction. Due thereto, the braking gear 220 rotates in the take-up direction. Further, while the pair of leaf springs 320, which are integral with the braking gear 220 and press-contact the outer peripheral surface of the braking shaft 314, rotate relative to the braking shaft 314 in the take-up direction, as shown in FIG. 8, the leaf springs 320 elastically deform (flexurally deform) alternately toward the outer peripheral side and the inner peripheral side along the outer peripheral surface of the hexagonal braking shaft 314. Therefore, the friction resistance arising between the outer peripheral surface of the braking shaft 314 and the pair of leaf springs 320, and the deformation resistance of the leaf springs 320, can be applied to the braking gear 220 as rotation resistance.

In this way, at the webbing retractor 310, when the spool 24 rotates in the take-up direction at an angular velocity which is greater than or equal to the upper limit angular velocity VH, rotation resistance can be applied to the braking gear 220 from the braking shaft 314 and the pair of leaf springs 320 which rotate integrally with the braking gear 220 in the take-up direction. Therefore, rotation resistance acts on the spool 24 via the braking gear 220, and the rotational speed of the spool 24 in the take-up direction can be decelerated.

Accordingly, at the webbing retractor 310, the angular velocity of the spool 24, which rotates in the take-up direction due to the urging force of the spiral spring 40, can be controlled to less than or equal to the upper limit angular velocity VH. Therefore, even in a case in which the spool 24 which rotates in the take-up direction is suddenly decelerated immediately before the entire amount of the webbing belt 30 is taken-up onto the spool 24, if the upper limit angular velocity VH is appropriately set in accordance with the angular acceleration at which the inertial body 138 operates, the angular acceleration of the spool 24, which is decelerated immediately before the webbing belt 30 is taken-up, can reliably be maintained at less than or equal to the angular acceleration $\alpha$.

As a result, in accordance with the webbing retractor 310, the spool 24 is rotated in the take-up direction by the urging force of the spiral spring, and the inertial body 138 can reliably be prevented from moving from the non-operating position to the operating position immediately before the entire amount of the webbing belt 30 is taken-up by the spool 24. Therefore, the occurrence of end locking can be reliably prevented.

Note that, in the webbing retractor 310 relating to the present exemplary embodiment, the outer peripheral configuration of the cross-section, along the direction orthogonal to the axis, of the braking shaft 314 is formed to be hexagonal. However, provided that the outer peripheral configuration of the cross-section, along the direction orthogonal to the axis, of the braking shaft 314 is not circular, it does not have to be hexagonal, and may be a shape such as, for example, quadrilateral, octagonal, oval, or the like.

Further, in the first and second exemplary embodiments of the present invention, cases are described in which the spool braking mechanism relating to the present invention is applied to the so-called external-tooth-type webbing retractor 10, 310 in which the lock teeth 166A of the lock pawl 160 are made to mesh-together with the ratchet teeth 172A (external teeth) of the ratchet wheel 170 which rotates integrally with the spool 24, such that rotation of the spool 24 in the pull-out direction is impeded. However, the spool braking mechanism relating to the present invention may also be applied to a so-called internal-tooth-type webbing retractor which has a lock pawl disposed at a spool, and internal teeth formed at a frame which rotatably supports the spool, and which, at the time of a rapid deceleration of the vehicle or at the time when the vehicle occupant moves forward, causes the lock pawl to mesh with the internal teeth of the frame and restrains rotation of the spool in the pull-out direction. By applying the spool braking mechanism relating to the present invention to such an internal-tooth-type webbing retractor, the effect that end locking can be reliably prevented can be achieved.

What is claimed is:

1. A webbing retractor comprising:
   a spool on which a webbing for restraining a vehicle occupant is taken-up, the spool being able to rotate in a take-up direction and in a pull-out direction that is opposite to the take-up direction, and
   a spool braking mechanism that, when an angular velocity of the spool rotating in the take-up direction reaches a predetermined upper limit angular velocity, applies resistance to rotation of the spool and decelerates a rotational speed of the spool in the take-up direction, the spool braking mechanism including a braking shaft disposed coaxially with the spool, and a decelerating member applying rotation resistance to an outer peripheral surface of the braking shaft, wherein the spool braking mechanism further comprises:

a rotating body disposed coaxially and connected with the spool;

a braking gear disposed coaxially with the spool, and able to rotate relative to the spool;

a braking pawl disposed at the rotating body, and causing the braking gear to rotate integrally with the rotating body in the take-up direction; and a pawl driving mechanism that, when the spool is rotating in the take-up direction at less than the predetermined upper limit angular velocity, holds the braking pawl at a separated position at which the braking pawl is separated from the braking gear, and that, when the spool rotates in the take-up direction at greater than or equal to the predetermined angular velocity, operates the braking pawl to an engaging position at which the braking pawl engages with the braking gear, and the decelerating member comprises an elastic member that applies rotation resistance to the outer peripheral surface of the braking shaft when the braking gear rotates integrally with the rotating body.

2. The webbing retractor of claim 1, wherein the pawl driving mechanism comprises:

a mass body disposed at an outer peripheral side of an axial center of the rotating body, and able to move the braking pawl between the separated position and the engaging position; and a spring member urging the mass body toward the separated position, and when the rotating body is rotating in the take-up direction at less than the predetermined angular velocity, the spring member holds the mass body at the separated position, and when the rotating body rotates in the take-up direction at greater than or equal to the predetermined angular velocity, the spring member allows the mass body to swing by centrifugal force toward the engaging position against urging force thereof.

3. The webbing retractor of claim 1, wherein the elastic member comprises a torsion coil spring disposed at an outer peripheral side of the braking shaft.

4. The webbing retractor of claim 1, wherein the elastic member comprises a plate-shaped spring disposed at an outer peripheral side of the braking shaft, and the spring is disposed so as to press-contact the outer peripheral surface of the braking shaft.

5. The webbing retractor of claim 1, wherein the rotating body is connected to the spool and rotates integrally with the spool.

6. The webbing retractor of claim 1, wherein the braking shaft is fixed to the rotating body and rotates integrally with the rotating body, and, due to the braking gear rotating integrally with the rotating body, the decelerating member acts so as to decelerate rotation of the braking shaft.

7. The webbing retractor of claim 6, wherein the elastic member has a torsion coil spring disposed at an outer peripheral side of the braking shaft.

8. The webbing retractor of claim 6, wherein an outer peripheral cross-section of the braking shaft taken orthogonal to the axial direction thereof is circular.

9. The webbing retractor of claim 1, wherein the braking shaft is mounted to the rotating body so as to be able to rotate relative to the rotating body, and, due to the braking gear rotating integrally with the rotating body, the decelerating member slidingly-contacts an outer surface of the braking shaft and rotation of the braking gear is decelerated.

10. The webbing retractor of claim 9, wherein the elastic member comprises a plate-shaped spring disposed at an outer peripheral side of the braking shaft, and the spring is disposed so as to press-contact the outer peripheral surface of the braking shaft.

11. The webbing retractor of claim 9, wherein an outer peripheral cross-section of the braking shaft taken orthogonal to the axial direction thereof is non-circular.

12. The webbing retractor of claim 9, wherein the outer peripheral surface of the braking shaft forms a polygonal column surface.

13. The webbing retractor of claim 9, wherein the braking shaft is fixed so as to be unable to rotate with respect to the webbing retractor.

* * * * *